(12) United States Patent
Fujita et al.

(10) Patent No.: US 8,134,672 B2
(45) Date of Patent: Mar. 13, 2012

(54) LIQUID CRYSTAL DEVICE AND ELECTRONIC APPARATUS

(75) Inventors: Shin Fujita, Suwa (JP); Shin Koide, Chino (JP)

(73) Assignee: Sony Corporation, Tokyo (JP)

( * ) Notice: Subject to any disclaimer, the term of this patent is extended or adjusted under 35 U.S.C. 154(b) by 542 days.

(21) Appl. No.: 11/715,974

(22) Filed: Mar. 9, 2007

(65) Prior Publication Data
US 2007/0242204 A1 Oct. 18, 2007

(30) Foreign Application Priority Data
Mar. 15, 2006 (JP) .................................. 2006-070997

(51) Int. Cl.
*G02F 1/1343* (2006.01)
(52) U.S. Cl. ........................................................ 349/141
(58) Field of Classification Search .................... 349/141
See application file for complete search history.

(56) References Cited

U.S. PATENT DOCUMENTS

| | | | | |
|---|---|---|---|---|
| 5,781,261 | A * | 7/1998 | Ohta et al. ..................... | 349/111 |
| 6,433,841 | B1 * | 8/2002 | Murade et al. .................. | 349/43 |
| 6,710,835 | B2 | 3/2004 | Kurahashi et al. | |
| 6,768,531 | B2 | 7/2004 | Ochiai et al. | |
| 6,816,222 | B2 | 11/2004 | Ono et al. | |
| 6,850,303 | B2 * | 2/2005 | Kimura et al. ................ | 349/141 |
| 7,486,351 | B2 * | 2/2009 | Itou et al. ........................ | 349/99 |
| 2005/0041182 | A1 * | 2/2005 | Ono et al. ...................... | 349/106 |
| 2005/0105034 | A1 | 5/2005 | Ono et al. | |
| 2005/0200790 | A1 | 9/2005 | Konno et al. | |
| 2006/0028603 | A1 * | 2/2006 | Lee et al. ....................... | 349/141 |
| 2007/0126969 | A1 | 6/2007 | Kimura et al. | |
| 2007/0171319 | A1 * | 7/2007 | Fujita et al. ..................... | 349/43 |

FOREIGN PATENT DOCUMENTS

| | | |
|---|---|---|
| CN | 1979275 A | 6/2007 |
| JP | A 2001-235763 | 8/2001 |
| JP | A 2002-182230 | 6/2002 |
| JP | A-2002-221736 | 8/2002 |
| JP | A-2005-257883 | 9/2005 |
| JP | 2007-086657 | 5/2007 |
| KR | 2002-0063498 A | 8/2002 |
| KR | 2003-0011692 A | 2/2003 |

OTHER PUBLICATIONS

U.S. Appl. No. 11/652,623, Shin Fujita et al., Jan. 12, 2007.
Japanese Office Action issued on Jul. 7, 2010 corresponding to Japanese Patent Appln. No. 2006-070997.

* cited by examiner

*Primary Examiner* — Thanh-Nhan P. Nguyen
(74) *Attorney, Agent, or Firm* — K&L Gates LLP

(57) ABSTRACT

A liquid crystal device includes a substrate for holding a liquid crystal. The substrate includes switching elements, a first insulating layer which overlies the switching elements and which has contact holes located at positions corresponding to the switching elements, first transparent electrodes which overlie the first insulating layer and which are electrically connected to the switching elements through the contact holes, a second insulating layer overlying the first transparent electrodes, and second transparent electrodes which overlie the second insulating layer and which each have a plurality of slits for generating electric fields between the first and second transparent electrodes, the second transparent electrodes not overlapping the contact holes in plan view.

12 Claims, 8 Drawing Sheets

200

LIQUID CRYSTAL DEVICE AND ELECTRONIC APPARATUS

CROSS-REFERENCE TO RELATED APPLICATION

This application claims priority from Japanese Patent Application No. 2006-070997, filed in the Japanese Patent Office on Mar. 15, 2006, the entire disclosure of which is hereby incorporated by reference in its entirety.

BACKGROUND

1. Technical Field

Embodiments of the present invention relate to a liquid crystal device for displaying various types of information and also relate to an electronic apparatus including the liquid crystal display.

2. Related Art

Examples of liquid crystal display modes include twisted nematic (TN) modes, vertical alignment modes for achieving a wide viewing angle and a high contrast ratio, transverse electric field modes such as an in-plane switching (IPS) mode and a fringe field switching (FFS) mode.

In the EPS mode, electric fields are applied to liquid crystal molecules in parallel to substrates. The IPS mode is superior to the TN mode in that a wide viewing angle can be achieved.

In general, an IPS-mode liquid crystal device includes pixel electrodes made of a transparent conductive material such as indium tin oxide (ITO) and common electrodes for generating transverse electric fields in cooperation with the pixel electrodes and the pixel and common electrodes are arranged in a single layer. Hence, there is a problem in that liquid crystal molecules located above the pixel electrodes cannot be sufficiently driven and this causes a reduction in transmittance.

On the other hand, in an FFS-mode liquid crystal device, a layer having common electrodes is overlaid with a layer having pixel electrodes with an interlayer insulating layer lying between these layers. Hence, electric fields can be applied transversely to liquid crystal molecules located above these pixel electrodes and therefore these pixel electrodes can be sufficiently driven. Thus, the FFS-mode liquid crystal device is superior in transmittance to the IPS-mode liquid crystal device.

JP-A-2001-235763 (hereinafter referred to as Patent Document 1) and JP-A-2002-182230 (hereinafter referred to as Patent Document 2) disclose FFS-mode liquid crystal devices.

The FFS-mode liquid crystal devices include amorphous-silicon thin-film transistors (a-Si TFTs).

The FFS-mode liquid crystal devices have a problem that when an insulating layer located between common electrodes and pixel electrodes has a reduced thickness such that auxiliary capacitors can be readily formed using the insulating layer and such that the level of image signals can be reduced by increasing the intensity of electric fields generated between the common and pixel electrodes, the common and pixel electrodes can be short-circuited depending on the layout of the common and pixel electrodes.

SUMMARY

Embodiments of the invention provide a FFS-mode liquid crystal device in which although an insulating layer has a reduced thickness such that auxiliary capacitors are readily formed, common electrodes and pixel electrodes reduces can be can be prevented from being short-circuited. Some embodiments provide an electronic apparatus including the FFS-mode liquid crystal device.

A liquid crystal device according to some embodiments of the present invention includes a substrate for holding a liquid crystal. The substrate includes switching elements, a first insulating layer which overlies the switching elements and which has contact holes located at positions corresponding to the switching elements, first transparent electrodes which are arranged on the first insulating layer and which are electrically connected to the switching elements through the contact holes, a second insulating layer overlying the first transparent electrodes, and second transparent electrodes which are arranged on the second insulating layer and which each have a plurality of slits for generating electric fields between the first and second transparent electrodes. The second transparent electrodes do not overlap with the contact holes in plan view.

In some embodiments of a liquid crystal display, the first insulating layer is made of, for example, a transparent acrylic resin or the like; the second insulating layer is made of, for example, silicon dioxide ($SiO_2$) or silicon nitride ($SiN_x$); and the electric fields may be fringe fields having strong field components substantially parallel to the substrate and strong field components substantially perpendicular to the substrate. This allows the liquid crystal display to operate in an FFS mode.

The switching elements may be three-terminal elements such as low-temperature polysilicon (LTPS) TFTs formed on glass substrates at a temperature of 600° C. or less, polysilicon (p-Si) TFTs, or amorphous silicon (a-Si) TFTs or two-terminal elements such as thin-film diodes (TFDs). The first transparent electrodes can serve as pixel electrodes that are minimum display units. The second transparent electrodes can serve as common electrodes connected to a common potential terminal. The first and second insulating layers can be flat such that the distance between each first transparent electrode and second transparent electrode is maintained constant.

In some embodiments of a liquid crystal device, the first and second transparent electrodes preferably do not overlap at positions corresponding to the contact holes. Therefore, even if the second insulating layer serving as a dielectric layer has a extremely small thickness, portions of the first and second transparent electrodes that are located in the contact holes can be prevented from being short-circuited. This allows the second insulating layer to have a small thickness without causing a reduction in yield. Therefore, auxiliary capacitors can be readily formed using the second insulating layer and the level of image signals can be reduced by generating fringe fields having high intensity. In other words, the second insulating layer is allowed to have a small thickness without causing a reduction in yield; hence, the auxiliary capacitors have high capacitance and fringe fields generated between the first and second transparent electrodes have high intensity. This allows molecules of the liquid crystals to be readily operated.

In some embodiments of a liquid crystal device, one of the slits present in each second transparent electrode is preferably located near each contact hole; the second transparent electrodes preferably have notches; and the notches are preferably located at positions corresponding to the contact holes, have an area greater than that of the contact holes, and are each connected to the slit located near the contact hole.

This is effective in preventing the first and second transparent electrodes from overlapping at the positions corresponding to the contact holes. Hence, the first and second transparent electrode portions located in the contact holes can be prevented from being short-circuited.

Some embodiments of a liquid crystal device preferably further includes first lines and second lines. The first and second lines are electrically connected to the switching elements and intersect with each other. The slits are preferably tilted at a predetermined angle with respect to the first or second lines. The notches are preferably located near portions of the slits that are more greatly spaced from the first or second lines than other portions thereof.

In this configuration, the first or second lines may serve as source lines receiving data signals or gate lines receiving scanning signals. The notches are preferably located near intersections of the first and second lines. This allows the second transparent electrodes not to overlap with the contact holes in plan view.

Some embodiments of a liquid crystal device further include a counter substrate opposed to the substrate with the liquid crystal disposed therebetween. The counter substrate includes a light-shielding layer having portions overlapping with the notches and portions overlapping with the first or second lines.

In this configuration, the first or second lines may serve as source lines receiving data signals or gate lines receiving scanning signals.

Since the second transparent electrodes have the notches, portions of an alignment layer that are located near the notches cannot be sufficiently rubbed depending on the shape of the notches. Therefore, the liquid crystal molecules located above the insufficiently rubbed portions thereof cannot be aligned in the rubbing direction of the alignment layer. During the operation of the liquid crystal, voltages are differently applied to the liquid crystal molecules depending on whether the liquid crystal molecules are located above the insufficiently rubbed portions thereof or sufficiently rubbed portions thereof; hence, the liquid crystal molecules cannot be properly controlled in alignment. That is, the liquid crystal molecules located near the notches are misaligned. This can have an adverse effect on display quality.

Since the slits are tilted with respect to the first or second lines, fringe fields are generated in the longitudinal direction of the first or second lines during the operation of the liquid crystal. Therefore, the fringe fields generated in some subpixels act on other subpixels adjacent to those subpixels; hence, the liquid crystal molecules located near the first or second lines disposed between those subpixels and these subpixels adjacent thereto are misaligned. This can have an adverse effect on display quality.

In order to prevent the above problems, the counter substrate can include the light-shielding layer as described above. Therefore, even if the liquid crystal molecules present in regions located near the first or second lines or the notches are misaligned, these regions can be covered with the light-shielding layer. Therefore, display quality can be prevented from being deteriorated due to the misalignment of the liquid crystal molecules.

An embodiment of an electronic apparatus according to the present invention includes a display section including the liquid crystal device.

BRIEF DESCRIPTION OF THE DRAWINGS

Some embodiments of the invention will be described with reference to the accompanying drawings, wherein like numbers reference like elements.

DESCRIPTION OF EXEMPLARY EMBODIMENTS

Embodiments of the present invention will now be described with reference to the accompanying drawings. The embodiments provide liquid crystal devices and an electronic apparatus. The term "inner face" herein means an inner face directed to a liquid crystal layer. That is, the term "an inner face of an element substrate" means an inner face of an element substrate that is directed to a liquid crystal layer.

First Embodiment

A liquid crystal device 100 according to a first embodiment of the present invention will now be described with reference to FIG. 1.

Figure 1:
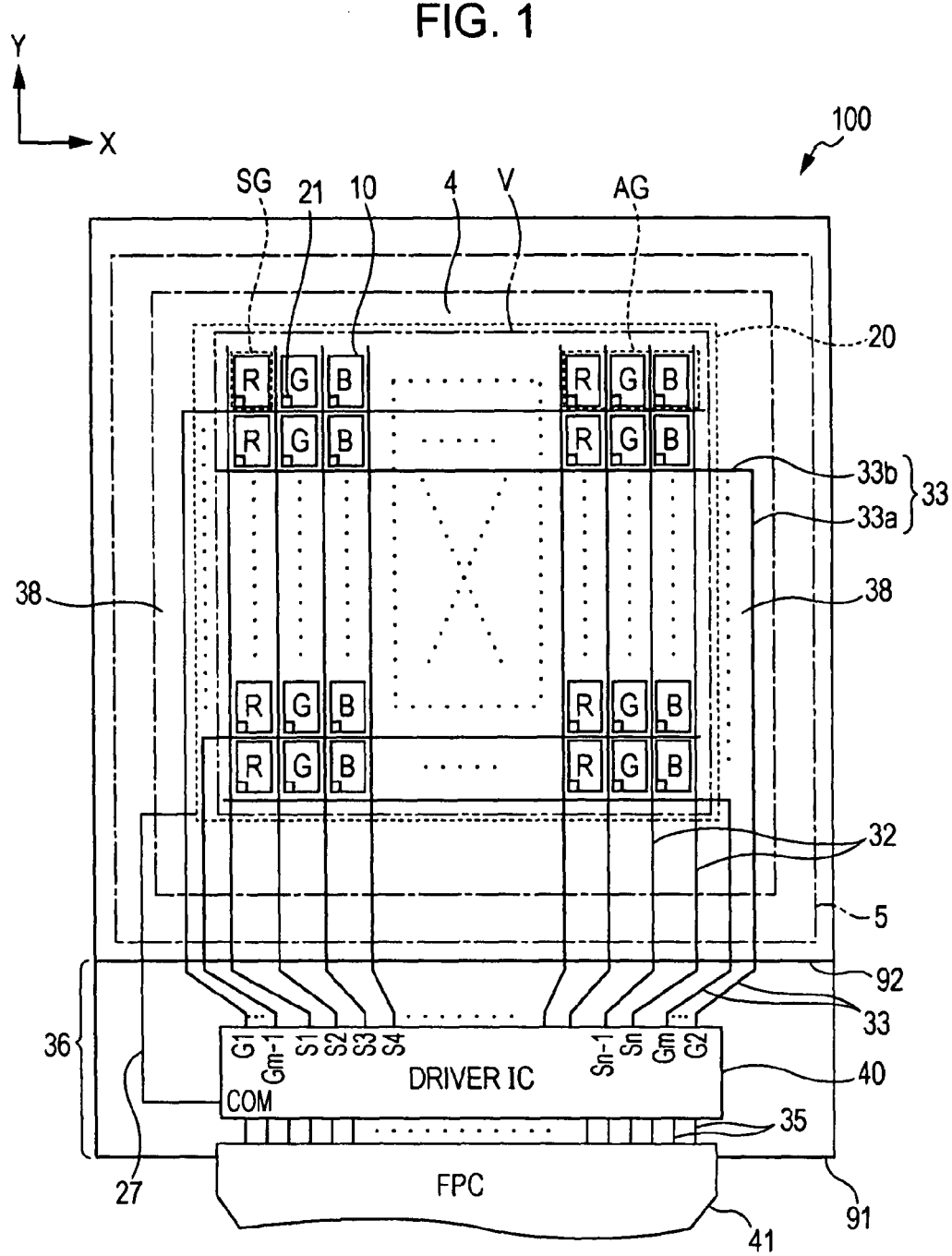
FIG. 1 is a plan view of a liquid crystal device according to a first embodiment of the present invention.

FIG. 1 shows the liquid crystal device 100 in plan view. With reference to FIG. 1, a color filter substrate 92 is located close to an observer and an element substrate 91 is located far from the observer. The vertical or column direction in FIG. 1 is defined as a Y direction and the horizontal or row direction in FIG. 1 is defined as an X direction. R, G, and B represent red subpixel regions, green subpixel regions, and blue subpixel regions, respectively. The red, green, and blue subpixel regions R, G, and B are each referred to as subpixel regions SG. Pixel regions AG each consists of one red subpixel region R, green subpixel region G, and blue subpixel region B arranged in a row. One display region present in each subpixel region SG can hereinafter be referred to as a subpixel and one display region corresponding to each pixel region AG can hereinafter be referred to as referred to as a pixel.

The liquid crystal device 100 includes the element substrate 91, the color filter substrate 92 opposed to the element substrate 91, a sealing member 5 with a frame shape, and a liquid crystal layer 4 containing a liquid crystal. The element substrate 91 and the color filter substrate 92 are joined to each other with the sealing member 5 disposed therebetween. The liquid crystal layer 4 is disposed in a region partitioned by the sealing member 5 and is sealed with the sealing member 5.

The liquid crystal device 100 is used to display a color image using three colors: red, green, and blue. The liquid crystal device 100 is an active matrix addressing type and includes low-temperature polysilicon (LTPS) TFTs (hereinafter referred to as LTPS-TFTs 21), formed on a first substrate 1 at a temperature of 600° C. or less as described below, having a double gate structure. The liquid crystal device 100 operates in an FFS mode, that is, the liquid crystal device 100 controls molecules 4a (see FIG. 2) of the liquid crystal by generating fringe fields E (see FIG. 2) on the side of the element substrate 91 having various electrodes. The fringe fields E have components substantially parallel to the element substrate 91 and components substantially perpendicular to the element substrate 91. This allows the liquid crystal device 100 to have a wide viewing angle. The liquid crystal device 100 is a transmissive liquid crystal display.

An exemplary configuration of the element substrate 91 will now be described.

The element substrate 91 has an inner face overlaid with source lines 32, gate lines 33, the LTPS-TFTs 21, pixel electrodes 10, common electrodes 20, a driver IC 40, external connection wires 35, and a flexible printed circuit (FPC) 41.

With reference to FIG. 1, the element substrate 91 has a projecting region 36 projecting out of a side of the color filter substrate 92. The driver IC 40 is mounted on the projecting region 36. The driver IC 40 includes input terminals (not shown) electrically connected to one ends of the external connection wires 35. The other ends of the external connection wires 35 are electrically connected to the FPC 41.

The source lines 32 are arranged at appropriate intervals in the X direction so as to extend in the Y direction. One end of each of the source lines 32 can be electrically connected to output terminals (not shown) included in the driver IC 40.

The gate lines 33 have a titanium/aluminum/titanium three-layer structure and include first wires 33a extending in the Y direction and second wires 33b extending in the X direction. The second wires 33b extend from ends of first wires 33a into an effective display region V, intersect with the source lines 32, and are arranged at appropriate intervals in the Y direction. One end of each of the first wires 33a can be electrically connected to the output terminals of the driver IC 40.

The LTPS-TFTs 21 are arranged near the respective intersections of the source lines 32 and the second wires 33b and are electrically connected to the source lines 32, the gate lines 33, the pixel electrodes 10, and the like.

The pixel electrodes 10 are made of a transparent conductive material such as indium tin oxide (ITO) and are arranged in respective subpixel regions SG.

Figure 2:
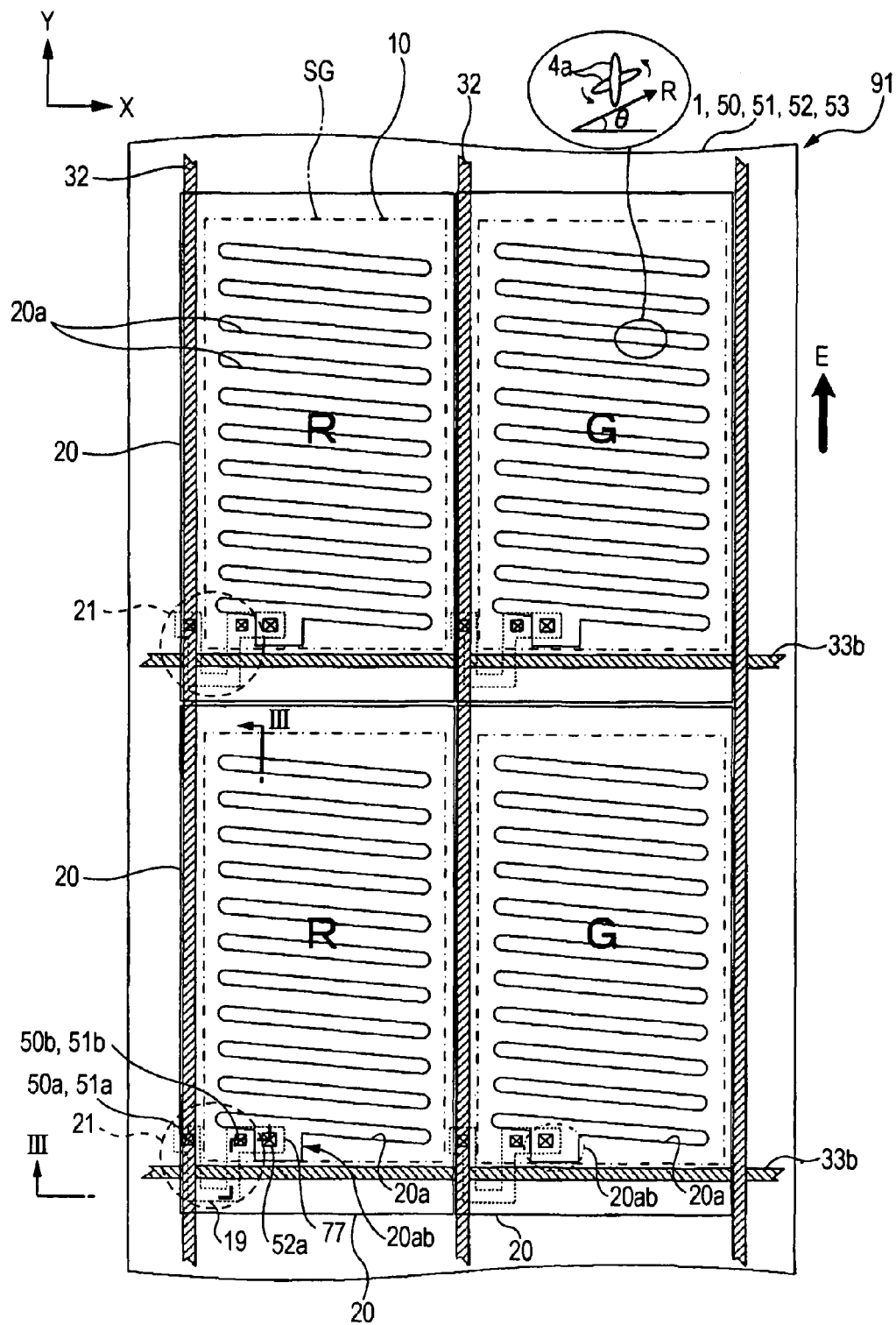
FIG. 2 is an enlarged plan view of the liquid crystal device of the first embodiment.

The common electrodes 20 are made of the same material as that used for the pixel electrodes 10 and are arranged to correspond to the pixel electrodes 10 as shown in FIG. 2. The common electrodes 20 are electrically connected to a common potential terminal COM included in the driver IC 40 through a wiring lead 27. The connection between the common electrodes 20 and the wiring lead 27 is not shown in FIG. 1.

The effective display region V includes the pixel regions AG arranged in a matrix pattern in the X and Y directions and corresponds to a region surrounded by a two-dotted chain line in FIG. 1. An image such as a character, a numeral, or a figure is displayed on the effective display region V. The effective display region V is surrounded by a frame region 38 not used to display any image. Inner faces of the pixel electrodes 10 are overlaid with a first alignment layer, which is not shown. The first alignment layer is rubbed in a predetermined direction as shown in FIG. 2.

The configuration of the color filter substrate 92 will now be described.

The color filter substrate 92 includes red-colored layers 6R, green-colored layers 6G, blue-colored layers 6B, an overcoat layer 16, and a second alignment layer 18. The red-colored, green-colored, and blue-colored layers 6R, 6G, and 6B can be hereinafter collectively referred to as colored layers 6. The overcoat layer 16 is made of an acrylic resin or another resin and overlies inner faces of the colored layers 6. The second alignment layer 18 is made of an organic material such as polyimide and overlies an inner face of the overcoat layer 16. The second alignment layer 18 is rubbed in a predetermined direction as shown in FIG. 2.

In the liquid crystal device 100 having the above configuration, the gate lines 33 are each independently selected with the driver IC 40 sequentially in the order of $G_1, G_2, \ldots, G_{m-1}$, and $G_m$ on the basis of signals, electric power, and the like supplied from the FPC 41 connected to an electronic apparatus, wherein m represents a natural number. Gate signals with a selection voltage are supplied to the selected gate lines 33 and gate signals with a non-selection voltage are supplied to the unselected gate lines 33. The driver IC 40 supplies source signals corresponding to display contents to the pixel electrodes 10 located at positions corresponding to the selected gate lines 33 through the LTPS-TFTs 21 and the source lines 32 corresponding to $S_1, S_2, \ldots, S_{n-1}$, and $S_n$, wherein n represents a natural number. Therefore, the show status is switched to the hide or intermediate status and the liquid crystal molecules 4a in the liquid crystal layer 4 are controlled in alignment. This allows a desired image to be displayed on the effective display region V.

Figure 3:
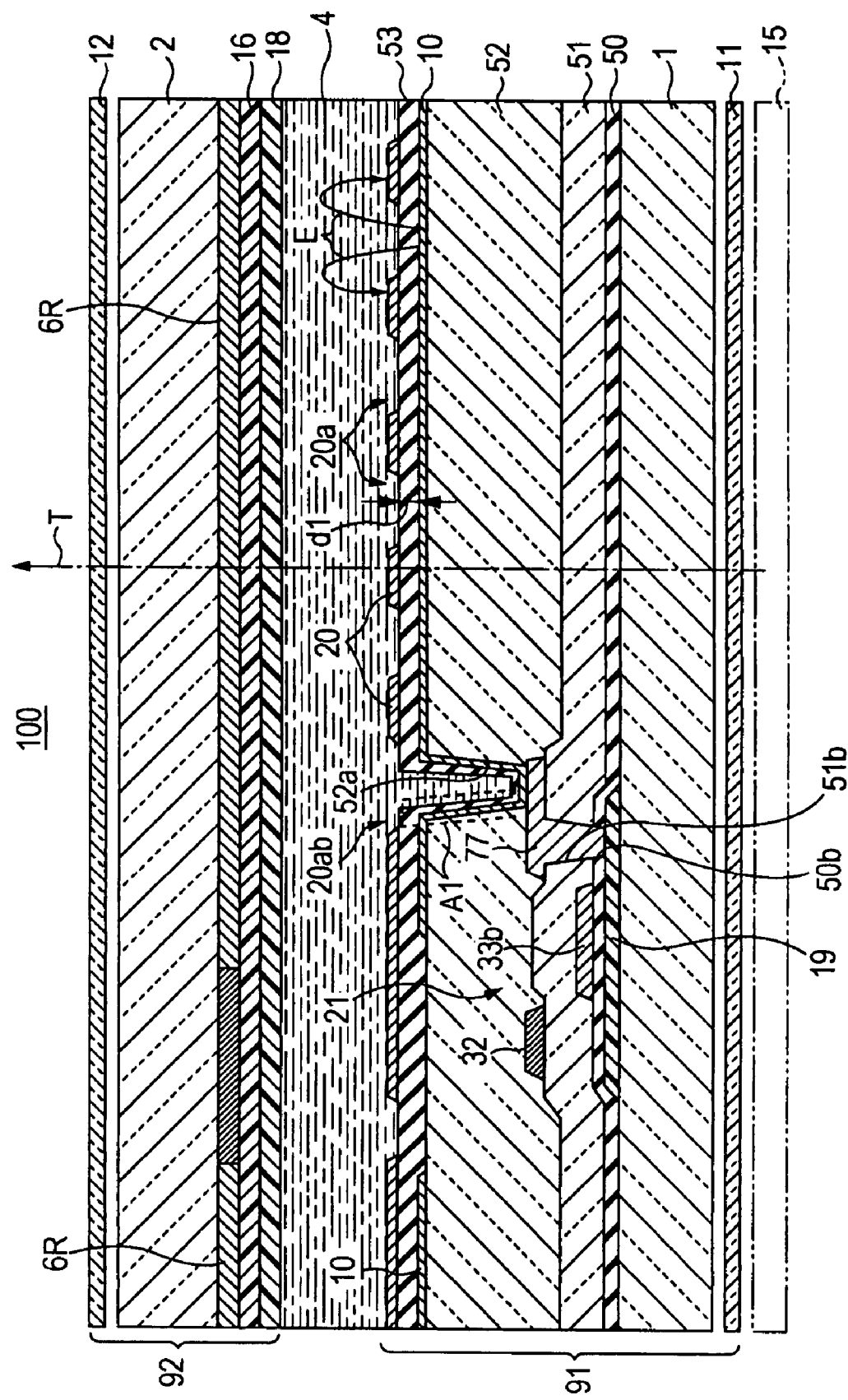
FIG. 3 is a sectional view of the liquid crystal device of the first embodiment taken along the line III-III of FIG. 2.

The configuration of the liquid crystal device 100 will now be described with reference to FIGS. 2 and 3.

FIG. 2 shows four subpixels included in the element substrate 91 in plan view. FIG. 3 shows the liquid crystal device 100 in cross section taken along the line III-III of FIG. 2. In particular, FIG. 3 shows one subpixel in cross section taken along a line extending through one of the LTPS-TFTs 21.

The element substrate 91 has a configuration as described below.

The element substrate 91 includes a first plate 1 made of, for example, glass. The first plate 1 is overlaid with p-Si layers 19, formed at low temperature, having substantially a U-shape in plan view. The p-Si layers 19 are arranged to correspond to the intersections of the source lines 32 and the second wires 33b and intersect with the second wires 33b twice. Inner faces of the p-Si layers 19 and an inner face of the first plate 1 are overlaid with a gate insulating layer 50 made of, for example, $SiO_2$.

The gate insulating layer 50 has first contact holes 50a and second contact holes 50b. The first contact holes 50a are located at positions corresponding to one ends of the p-Si layers 19 and overlap with portions of the source lines 32 in plan view. The second contact holes 50b are located at positions corresponding to the other ends of the p-Si layers 19. The gate insulating layer 50 has an inner face overlaid with gate lines 33. With reference to FIG. 2, the second wires 33b of the gate lines 33 are arranged at constant intervals in the Y direction so as to extend in the X direction and partly overlap with the p-Si layers 19 in plan view.

A first insulating layer 51 overlies inner faces of the gate lines 33 and the inner face of the gate insulating layer 50. The first insulating layer 51 is transparent and is made of, for example, $SiO_2$. The first insulating layer 51 has third contact holes 51a located at positions corresponding to the first contact holes 50a and fourth contact holes 51b located at positions corresponding to the second contact holes 50b. The first insulating layer 51 has an inner face overlaid with the source lines 32 and relay electrodes 77.

With reference to FIG. 2, the source lines 32 are arranged at constant intervals in the X direction so as to extend in the Y direction. The source lines 32 partly overlap with first end portions of the p-Si layers 19 in plan view and extend into the first and third contact holes 50a and 51a. The source lines 32 are electrically connected to the first end portions of the p-Si layers 19. The relay electrodes 77 overlap with second end portions of the p-Si layers 19 in plan view and extend into the second and fourth contact holes 50b and 51b. The relay electrodes 77 are electrically connected to the second end portions of the p-Si layers 19. Therefore, the source lines 32 are each electrically connected to the corresponding relay electrodes 77 with the p-Si layers 19 disposed therebetween. The LTPS-TFTs 21 are located at positions corresponding to the p-Si layers 19 and arranged to correspond to the intersections of the source lines 32 and the second wires 33b.

A second insulating layer 52 overlies inner faces of the source lines 32, inner faces of the relay electrodes 77, and the inner face of the first insulating layer 51. The second insulating layer 52 is made of, for example, a transparent acrylic resin or the like. The second insulating layer 52 has a flat inner face so as to serve as a planarization layer. The second insulating layer 52 has fifth contact holes 52a, located close to the second and fourth contact holes 50b 51b, extending to end portions of the relay electrodes 77. In this embodiment, an insulating layer made of, for example, $SiN_x$ may be present between the first and second insulating layers 51 and 52.

The second insulating layer 52 has an inner face overlaid with the pixel electrodes 10. The pixel electrodes 10 correspond to the subpixel regions SG and have substantially the same area as that of the subpixel regions SG. The pixel electrodes 10 have portions extending into fifth contact holes 52a and are electrically connected to the relay electrodes 77 through the fifth contact holes 52a. This allows source signals to be supplied to the pixel electrodes 10 from the source lines 32 through the LTPS-TFTs 21 and the relay electrodes 77.

A third insulating layer 53 made of a silicon compound such as $SiO_2$ or $SiN_x$ overlies the inner faces of the pixel electrodes 10 and the inner face of the second insulating layer 52. The first light-shielding layer 53 lies between the common electrodes 20 and the pixel electrodes 10 and functions as a dielectric layer for forming auxiliary capacitors. In order to achieve high capacitance, the third insulating layer 53 preferably has a small thickness.

Therefore, the third insulating layer 53 preferably has such a thickness that the auxiliary capacitors have a capacitance of about 100 to 600 fF and more preferably about 200 to 800 fF. When the definition is 200 ppi or more, the third insulating layer 53 preferably has a thickness of about 400 nm or less and more preferably about 50 to 400 nm. When the definition is less than 200 ppi, the third insulating layer 53 preferably has a thickness of about 200 to 1,000 nm.

The third insulating layer 53 has an inner face overlaid with the common electrodes 20. The common electrodes 20 correspond to the subpixels and are made of a transparent conductive material such as ITO. The common electrodes 20 are opposed to the pixel electrodes 10 with the third insulating layer 53 disposed therebetween and overlap with the pixel electrodes 10 in plan view. The common electrodes 20 also overlap with the source lines 32, located on the left of the subpixels as shown in FIG. 1, in plan view. The common electrodes 20 are electrically connected to the common potential terminal COM through the wiring lead 27 shown in FIG. 1 and therefore are maintained at a common potential. The common electrodes 20 each have a plurality of slits 20a for generating fringe fields E between the pixel electrodes 10 and the common electrodes 20. With reference to FIG. 2, the slits 20a are arranged at constant intervals in the longitudinal direction of the source lines 32 so as to be tilted at a predetermined angle with respect to the second wires 33b. In this embodiment, since the slits 20a are regularly arranged in the common electrodes 20, voltages are uniformly applied to the liquid crystal layer 4 during the operation of the liquid crystal device 100. This prevents the misalignment of the liquid crystal molecules 4a, resulting in the prevention of the deterioration of display quality.

In this embodiment, one of the slits 20a arranged in each common electrode 20 is located near one of the intersections of the source lines 32 and the second wires 33b, one of the LTPS-TFTs 21, and one of the fifth contact holes 52a and the common electrodes 20 have respective notches 20ab. The notches 20ab are located at positions corresponding to the fifth contact holes 52a and have an area greater than that of the second insulating layer 52. One of the notches 20ab is connected to this slit 20a. Therefore, the common electrodes 20 do not overlap with the fifth contact holes 52a in plan view. That is, the pixel electrodes 10 and the common electrodes 20 do not overlap at positions corresponding to the fifth contact holes 52a in plan view. The notches 20ab are located near the LTPS-TFTs 21 and the intersections of the source lines 32 and the second wires 33b and also located near portions of the slits 20a that are more greatly spaced from the second wires 33b than other portions thereof. In other words, the notches 20ab are connected to portions of the slits 20a that are more greatly spaced from the second wires 33b than other portions thereof.

In some embodiments of the present invention, the common electrodes 20 need not have the notches 20ab and may have openings, located at the positions corresponding to the fifth contact holes 52a, having an area greater than that of the fifth contact holes 52a.

The first alignment layer (not shown) overlies the inner face of the third insulating layer 53 and the inner faces of the common electrodes 20. The first alignment layer is preferably rubbed in the direction rotated about five degrees anticlockwise from the X direction. Therefore, the liquid crystal molecules 4a are aligned in an initial state such that the longitudinal axes of the liquid crystal molecules 4a are aligned in the rubbing direction R of the first alignment layer. A polarizing plate 11 underlies the first plate 1. A backlight 15 serving as a lighting unit is disposed under the polarizing plate 11. The configuration of the element substrate 91 is as described above.

The color filter substrate 92 has a configuration as described below.

The color filter substrate 92 includes a second plate 2 having an inner face overlaid with the colored layers 6, which are arranged in the subpixel regions SG. The overcoat layer 16 overlies inner faces of the colored layers 6. The overcoat layer 16 has a function of protecting the colored layers 6 from being corroded or contaminated with chemicals used in steps of manufacturing the liquid crystal device 100. The inner face of the overcoat layer 16 is overlaid with the second alignment layer 18. The configuration of the color filter substrate 92 is as described above.

When the pixel electrodes 10 are operated, the liquid crystal molecules 4a aligned in the rubbing direction R as shown in FIG. 2 are rotated counterclockwise by the fringe fields E generated along the source lines 32 and therefore realigned in the longitudinal direction of the source lines 32. With reference to FIG. 3, the fringe fields E are generated between the common electrodes 20 and the pixel electrodes 10 so as to extend through the slits 20a and the third insulating layer 53. The fringe fields E have strong field components substantially parallel to the element substrate 91 (strong field components acting in the horizontal direction in FIG. 3) and strong field components substantially perpendicular to the element substrate 91 (strong field components substantially perpendicular to the color filter substrate 92). This allows the alignment of the liquid crystal molecules 4a to be controlled, thereby performing transmissive display. In particular, rays of light emitted from the backlight 15 travel along a path T as shown in FIG. 3 and pass through the pixel electrodes 10, the common electrodes 20, and then the colored layers 6 to reach an observer. The light rays that have passed through the colored layers 6 have colors corresponding to those of the colored layers 6 and also have predetermined intensity. This allows an observer to see a desired color image.

Some advantages of the above-described liquid crystal device 100 will now be described.

A known liquid crystal device 500, operating in an FFS-mode, for comparison is described with reference to FIGS. 4 and 5. Components common to the known liquid crystal device 500 and the liquid crystal device 100 have the same or similar reference numerals and will not be described in detail.

Figure 4:
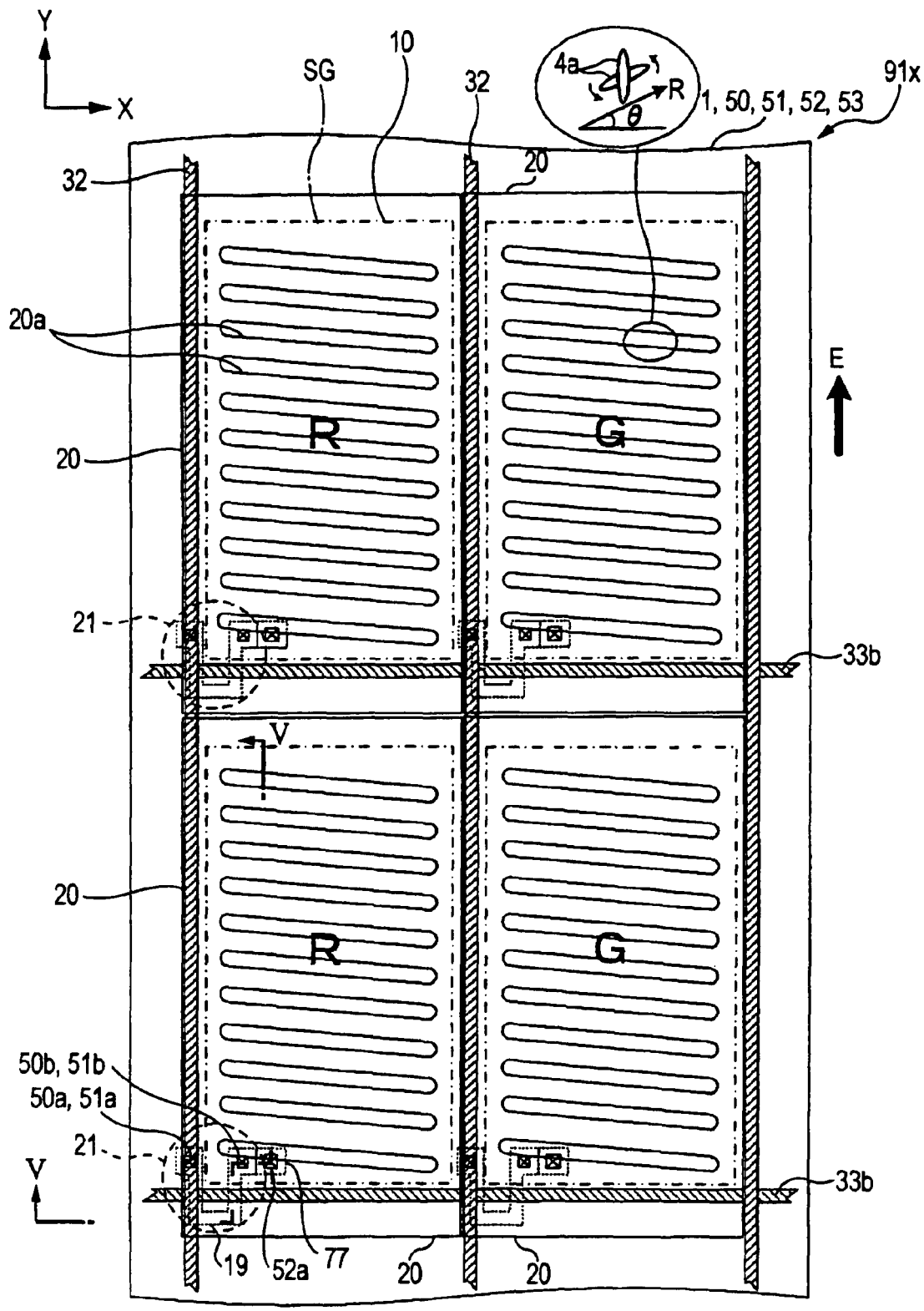
FIG. 4 is an enlarged plan view of a known liquid crystal device for comparison.

FIG. 4, as well as FIG. 2, shows four pixels included in an element substrate 91x included in the known liquid crystal device 500 in plan view. FIG. 5 shows a principal part of the known liquid crystal device 500 in cross section taken along the line V-V of FIG. 4. In particular, FIG. 5 shows one sub-pixel in cross section taken along a line extending through one of LTPS-TFTs 21 included in the known liquid crystal device 500.

In the liquid crystal device 100, those common electrodes 20 do not overlap with those fifth contact holes 52a in plan view. In contrast, in the known liquid crystal device 500, common electrodes 20 included in this element substrate 91x overlap with fifth contact holes 52a present in a second insulating layer 52 in plan view. In other words, these common electrodes 20 of the known liquid crystal device 500 have no notches while the common electrodes 20 of some embodiments of a liquid crystal device 100 of the present invention have notches 20ab, which are located at the positions overlapping with those fifth contact holes 52a in plan view and have an area greater than that of those fifth contact holes 52a. This is a difference between the known liquid crystal device 500 and the liquid crystal device 100.

The known liquid crystal device 500 has a problem as described below.

The known liquid crystal device 500, as well as the liquid crystal device 100, includes a third insulating layer 53 serving as a dielectric film for forming auxiliary capacitors disposed between these common electrodes 20 and pixel electrodes 10. In order to achieve high capacitance and in order to generate strong fringe fields to reduce the voltage level of image signals, this third insulating layer 53 has a small thickness.

Figure 5:
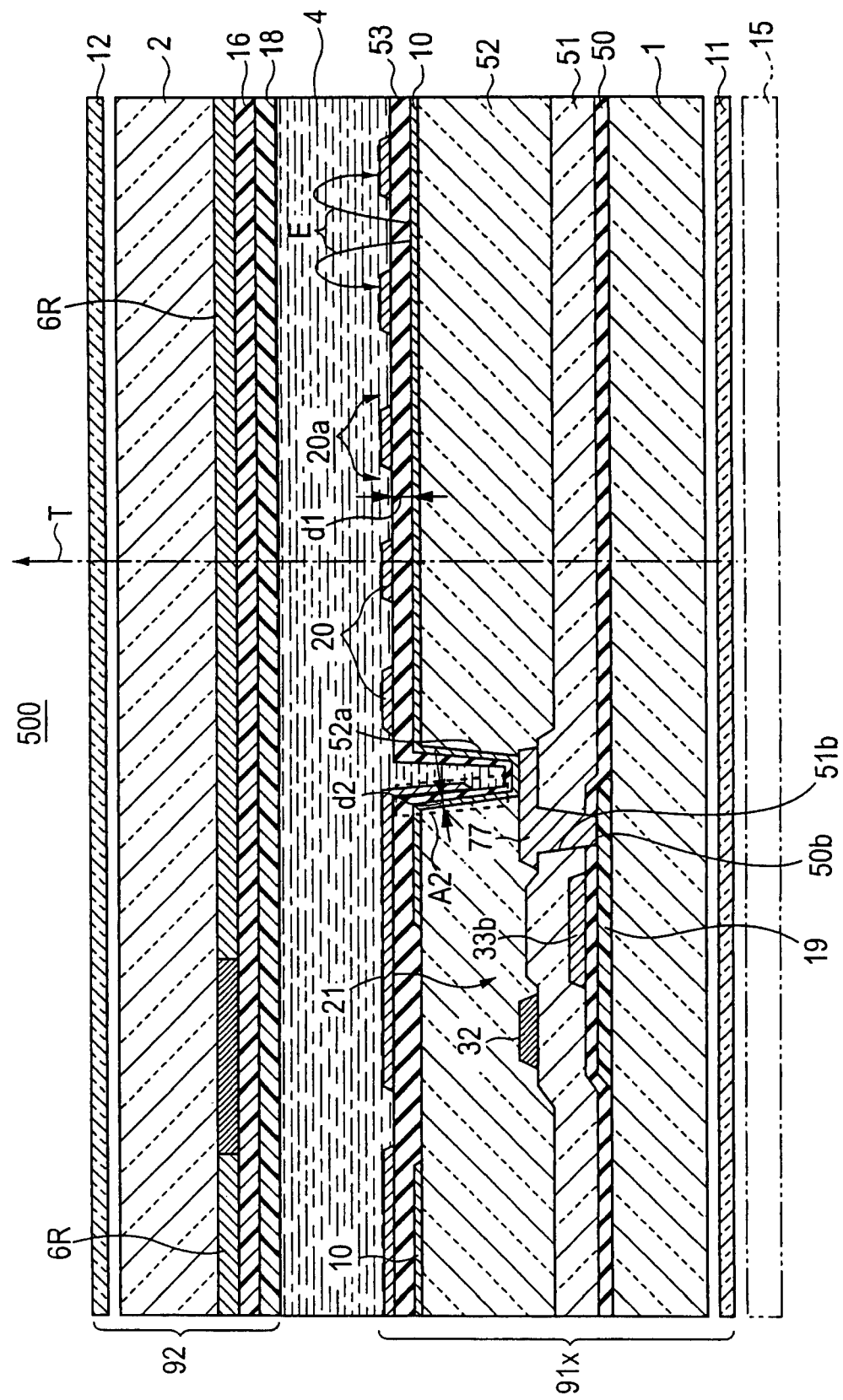
FIG. 5 is a sectional view of the known liquid crystal device taken along the line V-V of FIG. 4.

With reference to FIG. 5, these fifth contact holes 52a are tapered. Hence, portions of this third insulating layer 53 that are located in these fifth contact holes 52a have an extremely small thickness as compared to portions of this third insulating layer 53 that are located outside these fifth contact holes 52a. In the known liquid crystal device 500, these common electrodes 20 have no notches as described above; hence, portions of these common electrodes 20 extend into these fifth contact holes 52a as shown in FIG. 5. As is clear from a region A2 surrounded by a broken line shown in FIG. 5, these common electrodes 20 and these pixel electrodes 10 can be short-circuited in these fifth contact holes 52a depending on the thickness of this third insulating layer 53.

In contrast, in the liquid crystal device 100, those common electrodes 20 have the notches 20ab as described above. Therefore, as is clear from a region A1 surrounded by a broken line shown in FIG. 3, those common electrodes 20 do not overlap with those fifth contact holes 52a in plan view. That is, those pixel electrodes 10 and those common electrodes 20 do not overlap at positions corresponding to those fifth contact holes 52a. This is effective in preventing those pixel electrodes 10 and those common electrodes 20 from being short-circuited at the positions corresponding to those fifth contact holes 52a even if the that third insulating layer 53 has a small thickness. That is, portions of those pixel and common electrodes 10 and 20 that are located in those fifth contact holes 52a can be prevented from being short-circuited. This allows that third insulating layer 53 to have a small thickness without causing a reduction in yield. Therefore, the auxiliary capacitors can be readily formed using that third insulating layer 53 and the level of image signals can be reduced by generating fringe fields having high intensity. In other words, that third insulating layer 53 is allowed to have a small thickness without causing a reduction in yield; hence, the auxiliary capacitors have high capacitance and fringe fields generated between those pixel and common electrodes 10 and 20 have high intensity. This allows the liquid crystal molecules 4a to be readily operated.

Furthermore, the notches 20ab are connected to the portions of the slits 20a that are more greatly spaced from the second wires 33b than other portions thereof as described above. Therefore, those common electrodes 20 can be formed so as not to overlap with those fifth contact holes 52a in plan view in a process for manufacturing the liquid crystal device 100.

Second Embodiment

A liquid crystal device 200 according to a second embodiment of the present invention will now be described with reference to FIGS. 6 and 7.

Figure 6:
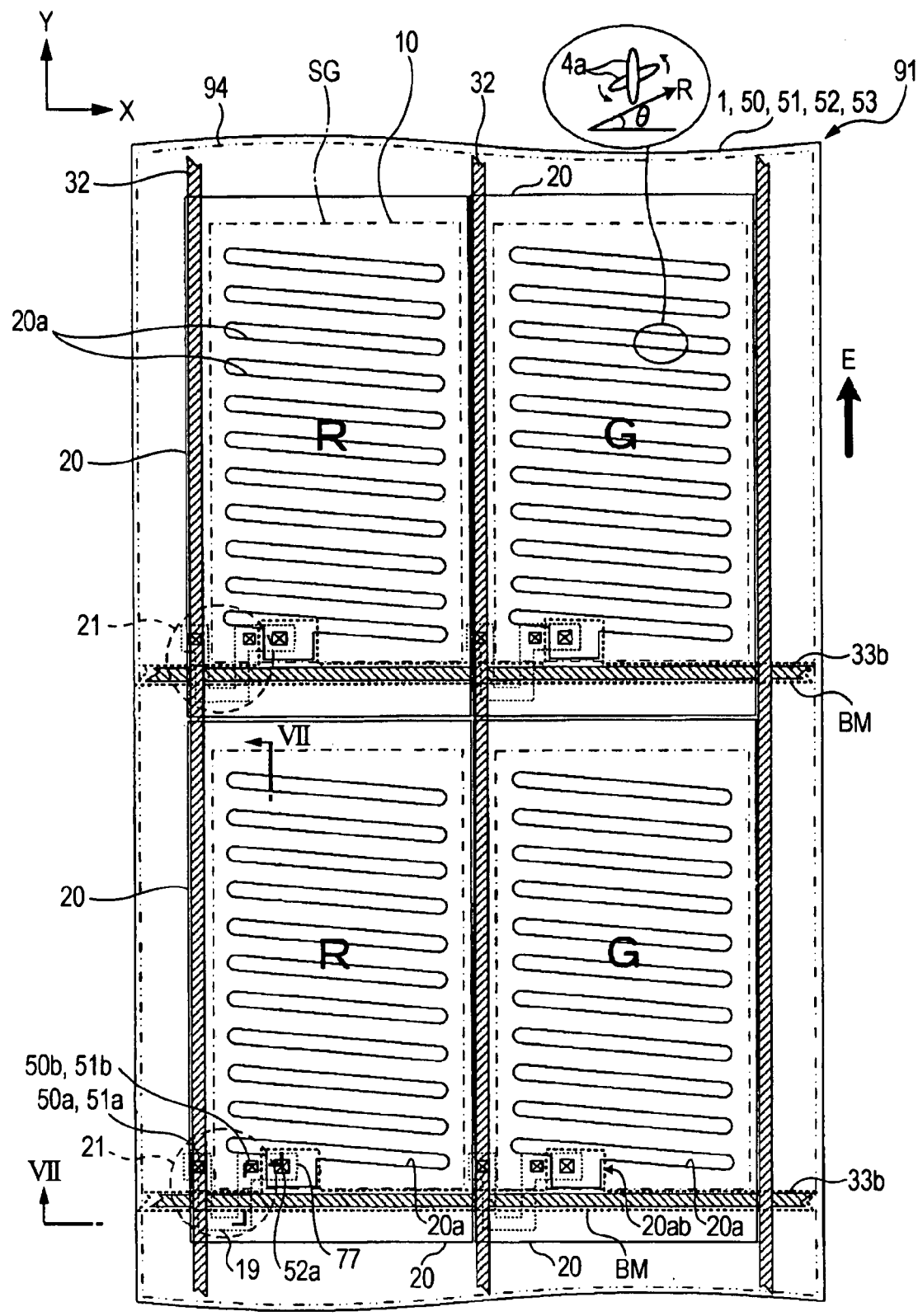
FIG. 6 is a plan view of a liquid crystal device according to a second embodiment of the present invention.
Figure 7:
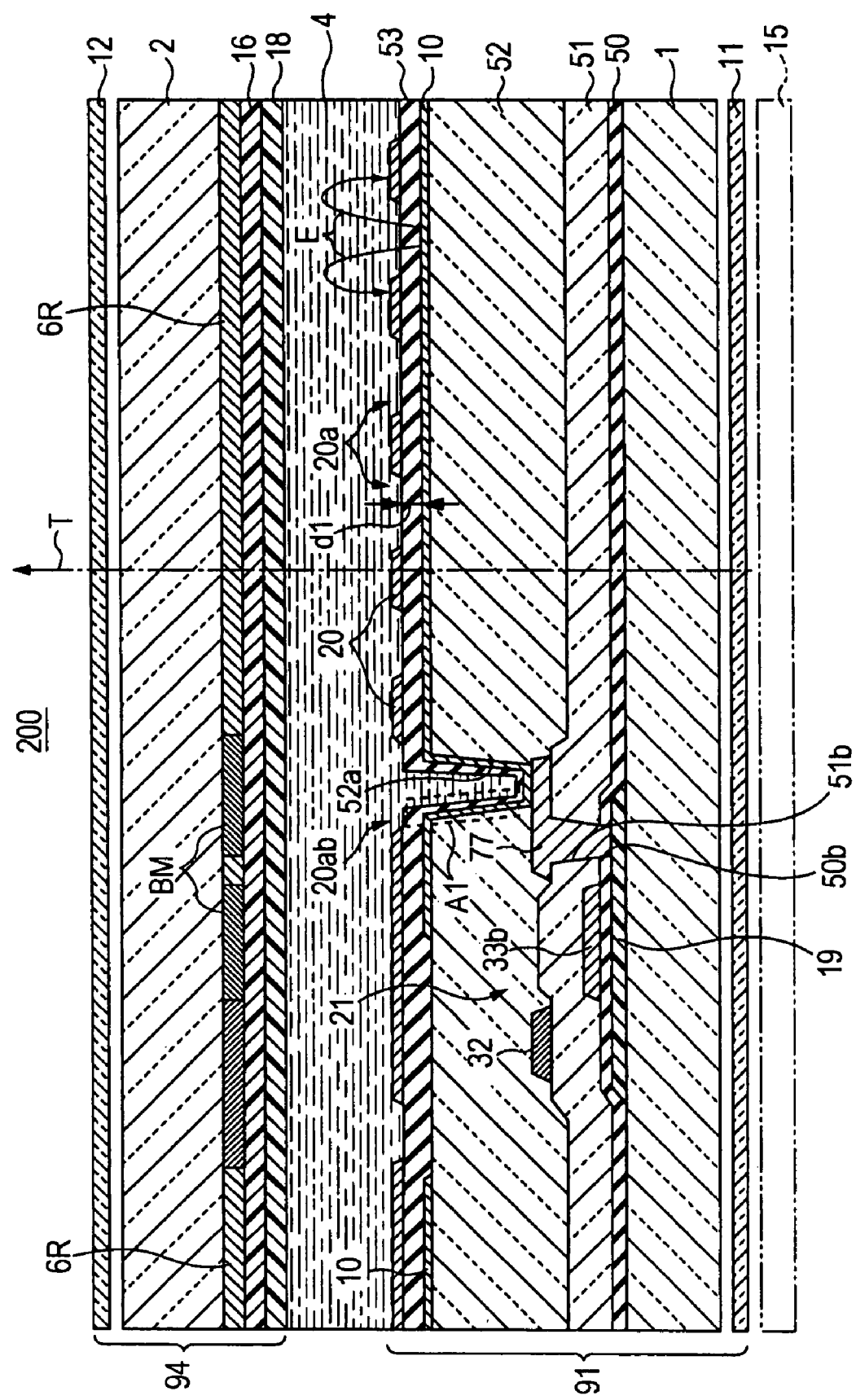
FIG. 7 is a sectional view of the liquid crystal device of the second embodiment taken along the line VII-VII of FIG. 6.

FIG. 6 shows four pixels in plan view. The pixels are included in an element substrate 91, included in the liquid crystal device 200, having a configuration similar to that described in the first embodiment. FIG. 6 also shows principal components included in a color filter substrate 94 included in the liquid crystal device 200. FIG. 7 shows a principal part of the liquid crystal device 200 in cross section taken along the line VII-VII of FIG. 6. In particular, FIG. 7 shows one sub-pixel in cross section taken along a line extending through one of LTPS-TFTs 21 included in the liquid crystal device 200.

The liquid crystal device 200 of this embodiment is different from the liquid crystal device 100 of the first embodiment in that the color filter substrate 94 of this embodiment has a configuration different from that of the color filter substrate 92 of the first embodiment. Other components of the liquid crystal device 200 of this embodiment are substantially the same as those of the liquid crystal device 100 of the first embodiment. The same components have the same reference numerals and will not be described in detail.

Although the color filter substrate 92 of the first embodiment includes no light-shielding layer usually called "black matrix layer", the color filter substrate 94 of this embodiment includes a light-shielding layer BM. With reference to FIGS. 6 and 7, the light-shielding layer BM is surrounded by a thick broken line and has portions overlapping with second wires 33b included in gate lines 33 and portions overlapping with notches 20ab connected to fifth contact holes 52a.

The reason for the use of the light-shielding layer BM is as described below. A first alignment layer, which is not shown, overlies common electrodes 20 and third insulating layer 53. The first alignment layer is rubbed in the same direction as that described in the first embodiment. Therefore, liquid crystal molecules 4a are aligned in an initial state such that the longitudinal axes of the liquid crystal molecules 4a are aligned in the rubbing direction R of the first alignment layer. The common electrodes 20 have the notches 20ab, located at positions corresponding to the fifth contact holes 52a, having an area greater than that of the fifth contact holes 52a. The first alignment layer has portions located near the notches 20ab and the portions cannot be sufficiently rubbed depending on the shape of the notches 20ab. Therefore, the liquid crystal molecules 4a located above the insufficiently rubbed portions of the first alignment layer cannot be aligned in the rubbing direction R of the first alignment layer. During the operation of the liquid crystal device 200, voltages are differently applied to the liquid crystal molecules 4a depending on whether the liquid crystal molecules 4a are located above the insufficiently rubbed portions thereof or sufficiently rubbed portions thereof; hence, the liquid crystal molecules 4a cannot be properly controlled in alignment. That is, the liquid crystal molecules 4a located near the notches 20ab are misaligned. This can have an adverse effect on display quality.

With reference to FIG. 6, in the liquid crystal device 200, the common electrodes 20 have slits 20a. The slits 20a are arranged at constant intervals in the longitudinal direction of source lines 32 so as to be tilted at a predetermined angle with respect to the second wires 33b. Therefore, fringe fields E are generated during the operation of the liquid crystal so as to intersect with the second wires 33b, that is, the fringe fields E are generated in the Y direction, in which the source lines 32 extend. Therefore, the fringe fields E generated in some subpixels act on other subpixels adjacent to those subpixels in the Y direction; hence, the liquid crystal molecules 4a located near the second wires 33b disposed between those subpixels and the subpixels adjacent thereto are misaligned. This can have an adverse effect on display quality.

In order to prevent the above problems, the color filter substrate 94 of this embodiment includes the light-shielding layer BM as described above. Therefore, even if the liquid crystal molecules 4a present in regions located near the second wires 33b or the notches 20ab are misaligned, these regions can be covered with the light-shielding layer BM. Therefore, in this embodiment, similar results as those described in the first embodiment can be obtained and display quality can be prevented from being deteriorated due to the misalignment of the liquid crystal molecules 4a.

Modifications of the liquid crystal device 100 or 200 of the first or second embodiment will now be described. In the first or second embodiment, the slits 20a are arranged at constant intervals in the longitudinal direction of the source lines 32 so as to be tilted at a predetermined angle with respect to the second wires 33b as described above.

The present invention is not limited to this configuration. In a modification of the liquid crystal device 100 or 200 of the first or second embodiment, slits may be arranged at constant intervals in the longitudinal direction of source lines so as to extend in parallel to second wires included in gate lines.

Alternatively, these slits may be arranged at constant intervals in the longitudinal direction of these second wires so as to extend in parallel to these source lines or so as to be tilted at a predetermined angle with respect to these source lines. In this configuration, an alignment layer is preferably rubbed in the direction rotated about five degrees anticlockwise from the longitudinal direction of these source lines. In this case, fringe fields are generated in the longitudinal direction of these source lines; hence, one of the fringe fields that is generated in one of subpixels adjacent to one another in the longitudinal direction of these second wires (that is, in the X direction) acts on these adjacent subpixels and therefore liquid crystal molecules located near these source lines disposed between these subpixels are misaligned. This can have an adverse effect on display quality.

In order to prevent this problem, in the modification, a color filter substrate preferably includes a light-shielding layer having portions located at positions corresponding to these source lines and portions located at positions corresponding to notches connected to contact holes.

In the first or second embodiment, the third insulating layer 53 overlies the pixel electrodes 10 and is overlaid with the common electrodes 20. In another modification of the liquid crystal device 100 or 200, a third insulating layer may overly common electrodes and may be overlaid with pixel electrodes.

In the first or second embodiment, no common electrode line is used. In another modification of the liquid crystal device 100 or 200, an element substrate may include a common electrode line such that common electrodes are electrically connected to a common potential terminal included in a driver IC through the common electrode line and a wiring lead, unless these common electrodes have a problem in time constant. The position of the common electrode line is not particularly limited.

In the first and second embodiments, the liquid crystal devices 100 and 200 are of a transmissive type. The present invention can be applied to a reflective- or transflective-type liquid crystal device.

In the first or second embodiment, the LTPS-TFTs 21 are used. Instead, three-terminal elements such as p-Si TFTs or a-Si TFTs or non-linear two-terminal elements such as TFDs may be used.

In the first or second embodiment, the common electrodes 20 are each arranged in the corresponding subpixels. In another modification of the liquid crystal device 100 or 200, common electrodes may each overlap with a group of subpixels, arranged in the longitudinal direction of second wires included in gate lines, in plan view or a common electrode may extend over all subpixels.

Third Embodiment

A third embodiment of the present invention provides an electronic apparatus. The electronic apparatus includes the liquid crystal device 100 or 200 according to the first or second embodiment, incorporated as a functional part of the electronic apparatus. Examples of the electronic apparatus will now be described with reference to FIGS. 8A and 8B.

Figure 8A:
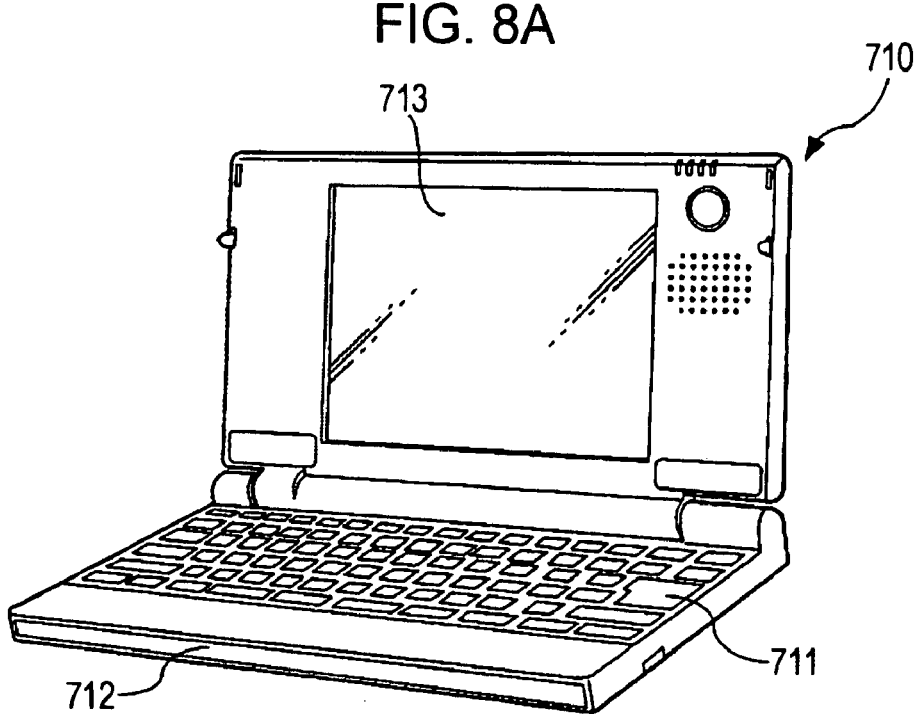
FIG. 8A is a perspective view of a personal computer that is an example of an electronic apparatus including the liquid crystal device of the first or second embodiment and FIG. 8B is a perspective view of a mobile phone that is another example of an electronic apparatus.

FIG. 8A shows a portable personal computer that is an example of the electronic apparatus in perspective view. The personal computer is a so-called notebook-type one. With reference to FIG. 8A, the personal computer is represented by reference numeral 710 and includes a main body 712 including a keyboard 711 and also includes a display section 713 including a panel. The panel includes the liquid crystal device 100 or 200 of the first or second embodiment.

Figure 8B:
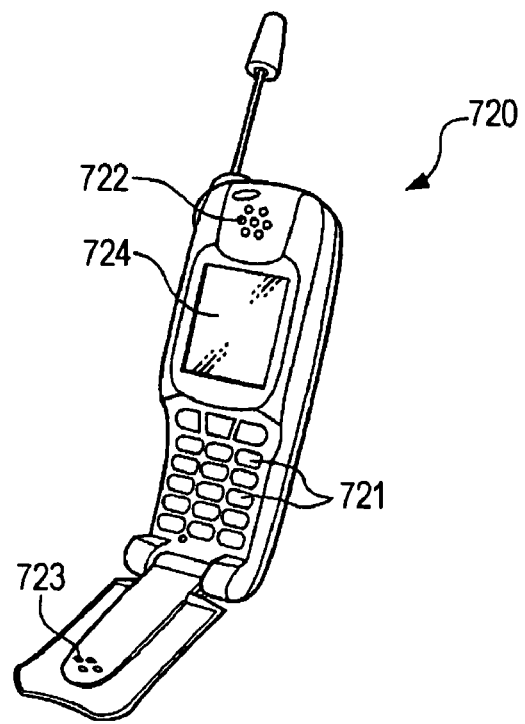

FIG. 8B shows a mobile phone that is another example of the electronic apparatus in perspective view. With reference to FIG. 8B, the mobile phone is represented by reference numeral 720 and includes a plurality of operation buttons 721, an earpiece 722, a mouthpiece 723, and a display section 724 including the liquid crystal device 100 or 200 of the first or second embodiment.

Examples of the electronic apparatus include liquid crystal televisions, viewfinder-type or direct view-type video tape recorders, car navigation systems, pagers, electronic notebooks, portable electronic calculators, word processors, work stations, video phones, point-of-sale (POS) terminals, and digital still cameras in addition to the personal computer 710 or the mobile phone 720.

Various modifications may be made within the scope of the present invention.

What is claimed is:

1. A liquid crystal device comprising:
   a substrate for holding a liquid crystal, the substrate including:
   (a) switching elements,
   (b) a first insulating layer which overlies the switching elements and which has contact holes located at positions corresponding to the switching elements,
   (c) first transparent electrodes which overlie the first insulating layer and which are electrically connected to the switching elements through the contact holes,
   (d) a second insulating layer overlying and in contact with the first transparent electrodes both in and outside the contact holes, and
   (e) second transparent electrodes which overlie the second insulating layer and which each has a plurality of slits for generating electric fields between the first and second transparent electrodes, the second transparent electrodes not overlapping the contact holes in plan view, the second transparent electrodes having notches with an area greater than that of the contact holes, the notches each being (1) located at a position corresponding to a respective one of the contact holes and (2) connected to a slit in the second transparent electrode that is located near the contact hole, wherein
      (i) a film thickness of a portion of the second insulating layer which is inside the contact holes and is also in contact with the first transparent electrodes is thinner than the film thickness of another portion of the second insulating layer which is outside the contact holes and is also in contact with the first transparent electrodes, and
      (ii) a direction of the film thickness is normal to the substrate.

2. The liquid crystal device of claim 1, the first and second transparent electrodes not overlapping at positions corresponding to the contact holes.

3. The liquid crystal device of claim 1, further comprising:
   first lines and second lines,
   the first and second lines being electrically connected to the switching elements and intersecting with each other,
   the slits being tilted at a predetermined angle with respect to the first or second lines, and
   the notches each being located at a portion of a slit that is farther from the first or second lines than a second portion of the slit.

4. The liquid crystal device of claim 3, wherein the notches are located near intersections of the first and second lines.

5. The liquid crystal device of claim 3, the first or second lines serving as source lines receiving data signals or gate lines receiving scanning signals.

6. The liquid crystal device of claim 1, further comprising:
   a counter substrate opposed to the substrate, the liquid crystal being between the substrate and the counter substrate, the counter substrate including a light-shielding layer having a portion that overlaps the notches and a portion that overlaps the first or second lines.

7. The liquid crystal device of claim 1, the first transparent electrodes serving as pixel electrodes that are minimum display units and the second transparent electrodes serving as common electrodes connected to a common potential terminal.

8. The liquid crystal device of claim 1, wherein the second insulating layer has a thickness of about 50 to 1,000 nm.

9. The liquid crystal device of claim 1, wherein the notches each protrude from the slit in the second transparent electrode that is located near the contact hole.

10. An electronic apparatus comprising:
    a display section including a liquid crystal device which includes a substrate for holding a liquid crystal, the substrate including:
    (a) switching elements,
    (b) a first insulating layer which overlies the switching elements and which has contact holes located at positions corresponding to the switching elements,
    (c) first transparent electrodes which overlie the first insulating layer and which are electrically connected to the switching elements through the contact holes,
    (d) a second insulating layer overlying and in contact with the first transparent electrodes both in and outside the contact holes, and
    (e) second transparent electrodes which overlie the second insulating layer and which each has a plurality of slits for generating electric fields between the first and second transparent electrodes, the second transparent electrodes not overlapping the contact holes in plan view, the second transparent electrodes having notches with an area greater than that of the contact holes, the notches each being (1) located at a position corresponding to a respective one of the contact holes and (2) connected to a slit in the second transparent electrode that is located near the contact hole, wherein
       (i) a film thickness of a portion of the second insulating layer which is inside the contact holes and is also in contact with the first transparent electrodes is thinner than the film thickness of another portion of the second insulating layer which is outside the contact holes and is also in contact with the first transparent electrodes, and
       (ii) a direction of the film thickness is normal to the substrate.

11. The electronic apparatus of claim 10, wherein the notches each protrude from the slit in the second transparent electrode that is located near the contact hole.

12. A liquid crystal device comprising:
    a color filter substrate;
    a substrate for holding liquid crystal including:
    (a) a switching element;
    (b) a first insulating layer disposed above the switching element, the insulating layer containing a contact hole at a position corresponding to the switching element;
    (c) a first electrode overlying the first insulating layer and electrically connected to the switching element through the contact hole;
    (d) a second insulating layer overlying and in contact with the first electrode both in and outside the contact hole; and
    (e) a second electrode disposed above the first electrode, the second electrode having a plurality of slits and an opening at a position corresponding to the contact hole, the opening being larger than the contact hole, wherein
       (i) a film thickness of a portion of the second insulating layer which is inside the contact hole and is also in contact with the first electrode is thinner than the film thickness of another portion of the second insulating layer which is outside the contact hole and is also in contact with the first electrode, and
       (ii) a direction of the film thickness is normal to the substrate; and
       (iii) the color filter substrate includes a light-shielding layer disposed above the liquid crystal, the light-shielding layer having a portion that overlaps the opening and a portion that overlaps the first or second lines, and
    liquid crystal disposed between the color filter substrate and the substrate for holding liquid crystal.

* * * * *